(Model.)
J. V. RANDALL.
AXLE LUBRICATOR.
No. 244,299. Patented July 12, 1881.
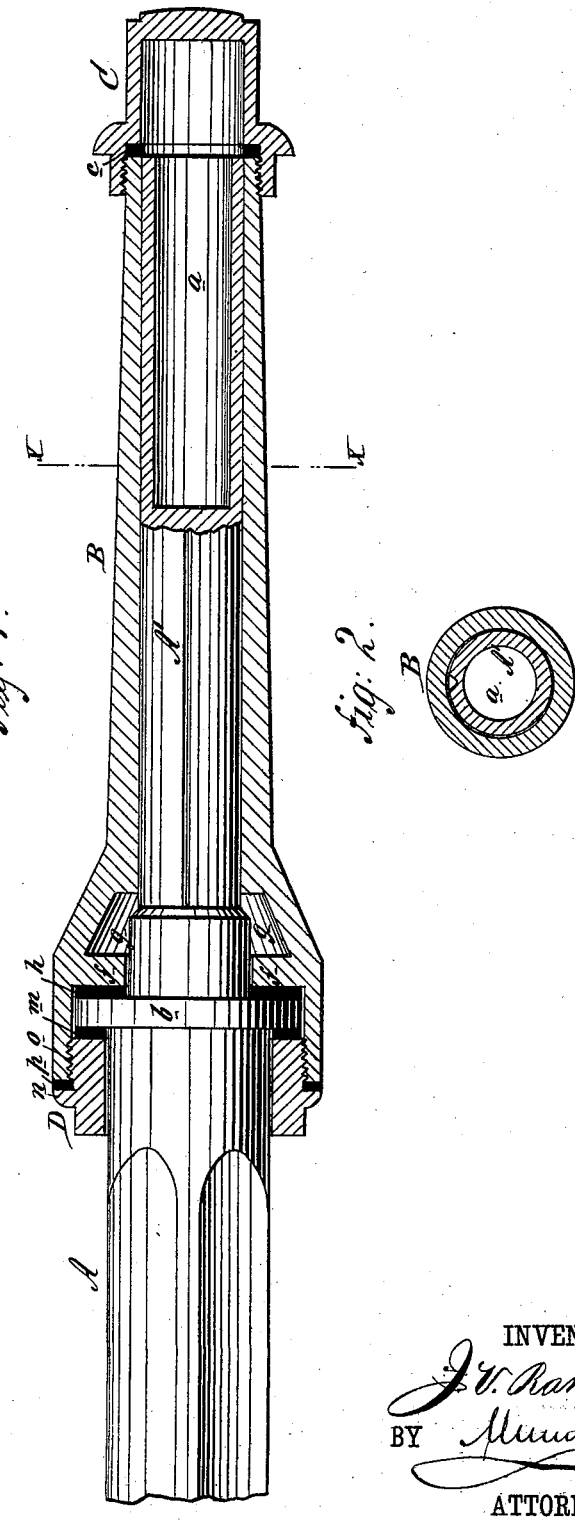
WITNESSES:
A. Schehl.
C. Sedgwick
INVENTOR:
J. V. Randall
BY Munn & Co.
ATTORNEYS.

UNITED STATES PATENT OFFICE.

JAMES V. RANDALL, OF NEWTOWN, PENNSYLVANIA.

AXLE-LUBRICATOR.

SPECIFICATION forming part of Letters Patent No. 244,299, dated July 12, 1881.

Application filed March 12, 1881. (Model.)

*To all whom it may concern:*

Be it known that I, JAMES V. RANDALL, of Newtown, in the county of Bucks and State of Pennsylvania, have invented a new and useful Improvement in Self-Lubricating Axles and Axle-Boxes, of which the following is a full, clear, and exact description, reference being had to the drawings hereto annexed.

This invention relates to self-lubricating axles which are provided with oil-cups at their outer ends and nuts for closing the same, and its object is to provide a simple and inexpensive lubricating device which shall be adapted for use in combination with the ordinary axle and axle-box.

In the accompanying drawings, Figure 1 is a longitudinal section of an axle-box, showing my improved self-lubricating axle; and Fig. 2 is a cross-section of the same on line X X of Fig. 1.

Heretofore self-lubricating axles and axle-boxes have been constructed with reference to wheel-hubs of special or unusual form, and consequently have not been adapted for general use. The wheel most commonly in use has a wooden hub and tapering axle-box secured therein, and the need of a suitable self-lubricating device for such a construction has long been felt. In providing such a lubricating device it is of the greatest importance that multiplicity of parts shall be avoided, since the action of the oil is liable to loosen the several parts and cause them to require constant attention. Moreover, where the number of parts is increased, in order to form an oil-cup at the end of the axle, the bearing-surface is necessarily increased in extent, and a greater degree of friction thereby caused; and, consequently, a larger quantity of oil is required for lubricating purposes.

To overcome the above-mentioned objections, and at the same time to provide a lubricating device which shall be adapted for general use, I construct the ordinary spindle A' of the axle A with a cylindrical chamber or cup, $a$, which is bored into the outer end of the spindle to any desired depth. The tapering axle-box B, which is to be secured in a wooden hub, (not shown,) is provided at its outer end with an external screw-thread, onto which the usual cup-nut, C, is screwed to close the open end of cup $a$, a suitable annular washer, $c$, being interposed between the end of the axle-box and the shoulder of the cup-nut to make a close joint without interfering with the flow of the oil over the end of the spindle. The axle-box B, at its inner or larger end, is provided with an oil-chamber, $g$, for receiving and checking the flow of oil from the cup $a$ when excessive. Such a receptacle has heretofore been constructed at the center of a spindle or axle-box; but this necessitates a hub of peculiar construction. By my construction, on the contrary, the axle-box and hub are allowed to retain their ordinary form, which experience has proved to be the best for general use.

For securing the axle-box and hub to the axle I adopt the use of the nut D, having a flange, $n$, and external screw-thread, $o$, by which it is screwed into the inner end of the box B, the collar $b$ on the axle and the flange $f$ in the axle-box serving, by means of washers $h$, $m$, and $p$, to form a close joint, and to hold the wheel in position.

I am aware that this method of securing a wheel upon its axle is not new, and therefore do not claim it as part of my invention.

The cup $a$, if desired, may be provided with a metallic lining, and a longitudinal groove is formed in the surface of the spindle, as shown in the drawings, to facilitate the flow of the oil.

I am aware that a chambered axle-spindle having radial openings for the passage of the oil has been patented; but such a device makes no provision for the flow of the oil over the end of the spindle, between the said spindle and the axle-box, whereby the greatest strength compatible with such a device may be secured. By the peculiar arrangement of the cup-nut and annular washer $c$, as shown in my invention, the oil has free passage from the cup $a$ over the outer end of the spindle, along the longitudinal groove in the surface of the spindle to the receptacle $g$ in the axle-box, whereby the oil-cup is made operative without weakening the spindle.

It will be readily seen that by my invention axles and axle-boxes may be made self-lubricating without largely departing from the ordinary and approved construction and without necessitating a multiplicity of parts.

Having thus described my invention, what I claim as new, and desire to secure by Letters Patent, is—

The combination of the tapering axle-box B, the cup-nut C, screwing on the outer end thereof, the annular washer c, interposed between said parts, and the spindle A', having oil-cup a bored in its outer end, and a suitable longitudinal groove formed in its surface and communicating with the oil-cup, substantially as shown and described, whereby the oil shall pass from the cup over the end of the spindle and along the groove, for the purpose specified.

JAMES V. RANDALL.

Witnesses:
PHINEAS WALKER,
SUMNER RANDALL.